(12) United States Patent
Babala et al.

(10) Patent No.: US 12,411,302 B2
(45) Date of Patent: Sep. 9, 2025

(54) LENS DESIGN AND METHODS OF MANUFACTURE THEREOF

(71) Applicant: ZF Active Safety and Electronics US LLC, Livonia, MI (US)

(72) Inventors: Michael Babala, Plymouth, MI (US); Matthew Warmuth, Northville, MI (US); Thomas E. Blake, III, Novi, MI (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 1190 days.

(21) Appl. No.: 16/696,642

(22) Filed: Nov. 26, 2019

(65) Prior Publication Data
US 2021/0157087 A1    May 27, 2021

(51) Int. Cl.
    *G02B 7/02*    (2021.01)
    *B29D 11/00*   (2006.01)
    *B29K 23/00*   (2006.01)
    *G02B 1/04*    (2006.01)

(52) U.S. Cl.
    CPC ........ *G02B 7/028* (2013.01); *B29D 11/00009* (2013.01); *G02B 1/041* (2013.01); *B29K 2023/38* (2013.01); *B29K 2995/0012* (2013.01)

(58) Field of Classification Search
    CPC .. G02B 7/028; G02B 1/041; B29D 11/00009; B29K 2023/38; B29K 2995/0012
    USPC ........................................................ 359/820
    See application file for complete search history.

(56) References Cited

U.S. PATENT DOCUMENTS

| 4,878,912 A | 11/1989 | Castleman | |
| 6,682,193 B1* | 1/2004 | Morris | B29D 11/00009 351/44 |
| 2001/0048002 A1* | 12/2001 | Buazza | B29D 11/00442 222/146.5 |
| 2003/0137746 A1* | 7/2003 | Kitaoka | G02B 7/028 359/687 |

(Continued)

FOREIGN PATENT DOCUMENTS

| DE | 102004056075 A1 | 5/2006 | |
| EP | 1804724 B1 | 7/2017 | |
| JP | 100379 A1 * | 2/1984 | ............... G02B 3/00 |

OTHER PUBLICATIONS

Office Action issued in German Patent Application No. 102020214709. 4; Application Filing Date Nov. 24, 2020; Date of Mailing Oct. 17, 2023 (10 pages).

*Primary Examiner* — Sharrief I Broome
(74) *Attorney, Agent, or Firm* — CANTOR COLBURN LLP

(57) ABSTRACT

Disclosed herein is a lens comprising a central portion that comprises a first polymer; wherein the central portion is operative to transmit electromagnetic radiation through it; and a peripheral portion that comprises a second polymer; where the peripheral portion accommodates a dimensional change in the central portion by absorbing energy and being transformed from a lower energy state to a higher energy state. Disclosed herein too is a method of manufacturing a lens comprising injecting into a mold a molten polymer to produce the lens; where the lens comprises a central portion; and a peripheral portion; where the peripheral portion accommodates a dimensional change in the central portion by absorbing energy and being transformed from a lower energy state to a higher energy state.

21 Claims, 6 Drawing Sheets

(56) References Cited

U.S. PATENT DOCUMENTS

| | | | |
|---|---|---|---|
| 2007/0065633 A1* | 3/2007 | Mori | G02B 1/041 |
| | | | 428/137 |
| 2008/0221676 A1 | 9/2008 | Coleman et al. | |
| 2009/0115962 A1* | 5/2009 | Bovet | B29D 11/00634 |
| | | | 156/146 |
| 2012/0046743 A1 | 2/2012 | Pinchuk | |
| 2013/0060331 A1* | 3/2013 | Shadduck | G02B 3/14 |
| | | | 623/6.13 |
| 2013/0258276 A1* | 10/2013 | Hansen | B29D 11/00153 |
| | | | 264/1.36 |
| 2013/0271641 A1* | 10/2013 | Calvet | G02B 7/028 |
| | | | 348/340 |
| 2014/0211149 A1* | 7/2014 | Hansen | B29D 11/00048 |
| | | | 351/159.01 |
| 2016/0054483 A1* | 2/2016 | Feng | G02B 3/14 |
| | | | 359/557 |
| 2017/0192256 A1* | 7/2017 | Fujinaka | G02C 7/108 |
| 2017/0261766 A1* | 9/2017 | Thompson | G02B 1/043 |
| 2017/0333255 A1* | 11/2017 | Bor | A61F 9/008 |
| 2018/0084161 A1* | 3/2018 | Lee | B60R 11/04 |
| 2019/0018169 A1* | 1/2019 | Aschwanden | H01L 27/14607 |
| 2019/0242369 A1* | 8/2019 | Huber | B32B 27/34 |
| 2021/0215849 A1* | 7/2021 | Chou | G02B 27/0955 |

* cited by examiner

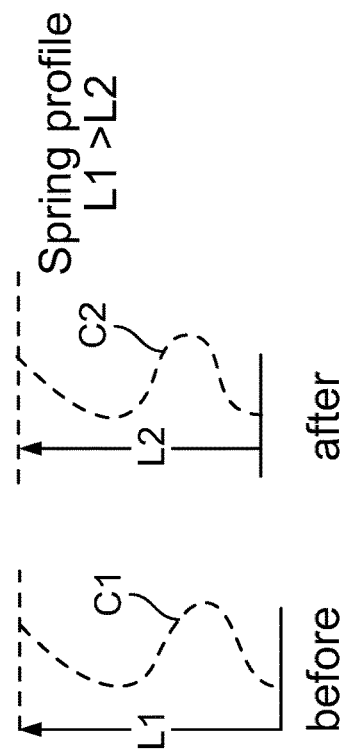
FIG. 3C
FIG. 3D
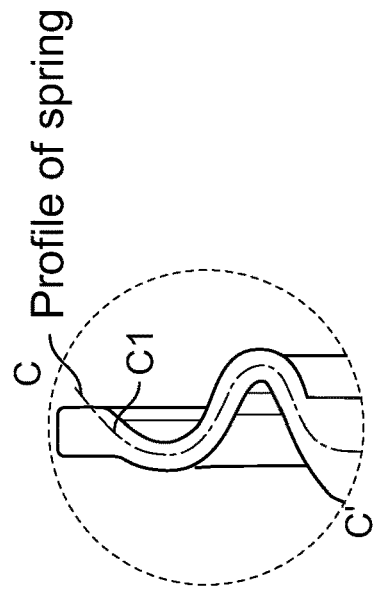
FIG. 3B
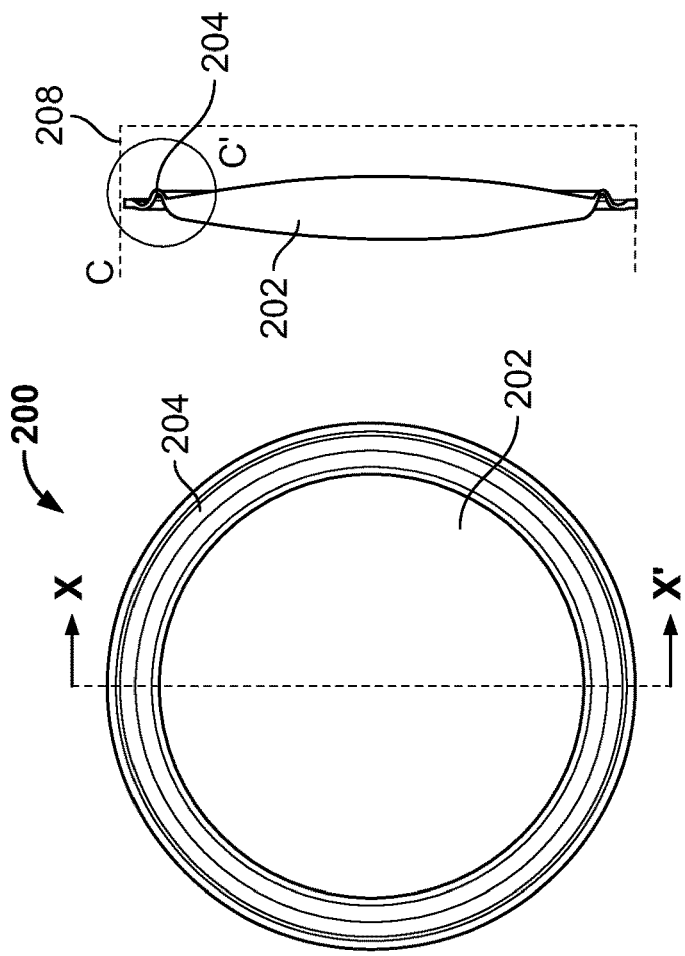
FIG. 3A

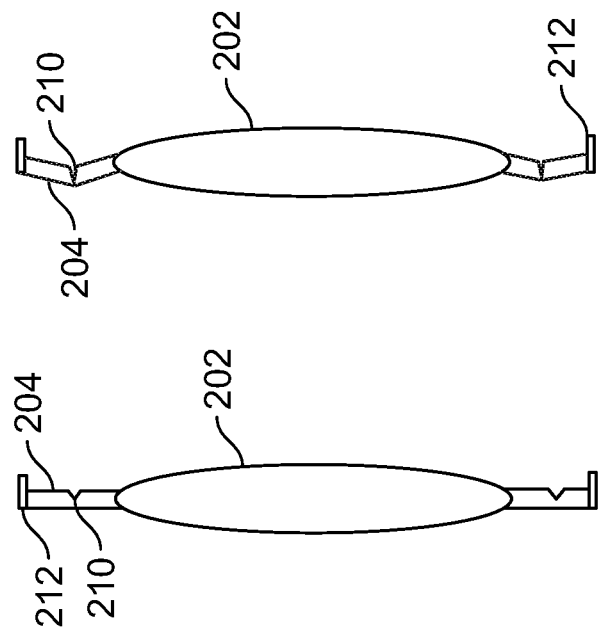
FIG. 4C
FIG. 4B
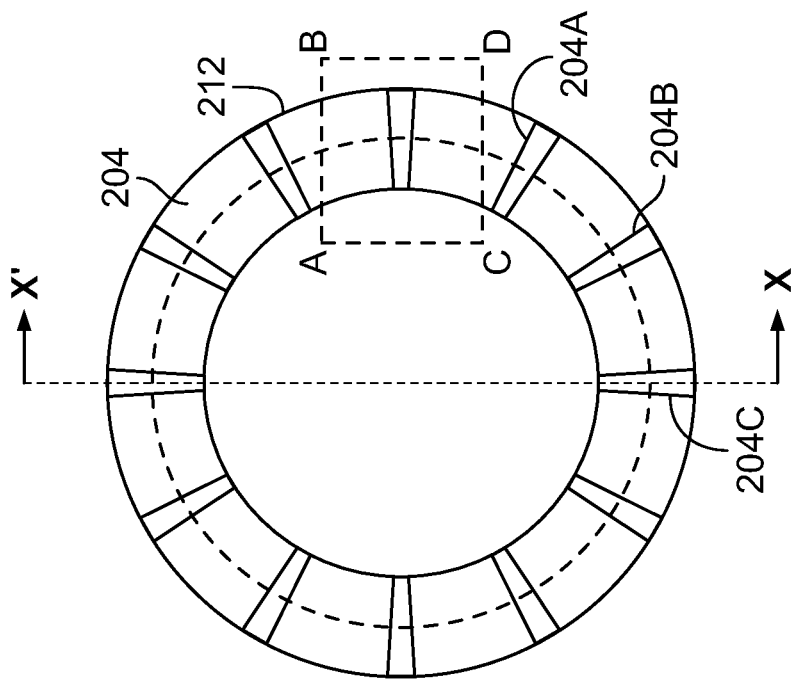
FIG. 4A

LENS DESIGN AND METHODS OF MANUFACTURE THEREOF

BACKGROUND

Disclosed herein is a lens design and methods of manufacture thereof. In particular, disclosed herein are lenses that accommodate a coefficient of thermal expansion mismatch and methods of manufacture thereof.

Advanced driver-assistance systems (ADAS) are used in vehicles to assist the driver while driving. When designed with a safe human-machine interface, they are intended to increase car safety and more generally road safety.

Advanced driver-assistance systems are systems developed to automate, adapt and enhance vehicle systems for safety and better driving. The automated system which is provided by ADAS to the vehicle is proven to reduce road fatalities, by minimizing human error that often causes accidents. Safety features are designed to avoid collisions and accidents by offering technologies that alert the driver to potential problems, or to avoid collisions by implementing safeguards and taking over control of the vehicle. Adaptive features may automate lighting, provide adaptive cruise control and collision avoidance, pedestrian crash avoidance mitigation (PCAM), incorporate satnav/traffic warnings, alert driver to other cars or dangers, lane departure warning system, automatic lane centering, show what is in blind spots, or connect to smartphones for navigation instructions. ADAS relies on inputs from multiple data sources, including automotive imaging, LiDAR, radar, image processing, computer vision, and in-car networking.

In order to facilitate automotive imaging, ADAS systems often incorporate lenses as part of an optical device. In an effort to make ADAS systems accessible to a larger demographic it is desirable to lower costs while at the same time improving performance. However, lower cost lenses suffer from drawbacks that should be overcome in order render them suitable for use in ADAS systems.

SUMMARY

A lens comprises a central portion that comprises a first polymer and a peripheral portion that comprises a second polymer. The central portion is operative to transmit electromagnetic radiation through it. The peripheral portion accommodates a dimensional change in the central portion by absorbing energy and being transformed from a lower energy state to a higher energy state.

In an embodiment, the peripheral portion undergoes a change in shape without any substantial dimensional change.

In yet another embodiment, the first polymer is the same as the second polymer.

In yet another embodiment, the first polymer is different from the second polymer.

In yet another embodiment, the peripheral portion surrounds the central portion along its entire circumferential periphery.

In yet another embodiment, the peripheral portion comprises a plurality of elements that do not contact each other and wherein each of the plurality of elements are in contact with the central portion.

In yet another embodiment, the peripheral portion has a cross-sectional area that has a linear profile or a curvilinear profile prior to energy absorption.

In yet another embodiment, the linear profile changes to a curvilinear profile due to the energy absorption.

In yet another embodiment, the curvilinear profile is a sinusoidal profile that may contain one or more troughs and one or more crests.

In yet another embodiment, the sinusoidal profile may contain a plurality of troughs and crests of varying amplitude and periodicity and where the amplitude or the periodicity change upon energy absorption.

In yet another embodiment, the peripheral portion comprises a prearranged deformation point.

In yet another embodiment, the second polymer has a negative coefficient of thermal expansion while the first polymer has a positive coefficient of thermal expansion.

In yet another embodiment, the first polymer and the second polymer comprise a cyclic olefin polymer.

In yet another embodiment, the cyclic olefin polymer comprises a cyclic olefin copolymer.

In yet another embodiment, an article comprises a lens that comprises a central portion that comprises a first polymer and a peripheral portion that comprises a second polymer. The central portion is operative to transmit electromagnetic radiation through it. The peripheral portion accommodates a dimensional change in the central portion by absorbing energy and being transformed from a lower energy state to a higher energy state.

In yet another embodiment, the article is an advanced driver-assistance system.

In one embodiment, a method of manufacturing a lens comprises injecting into a mold a molten polymer to produce the lens. The lens comprises a central portion and a peripheral portion. The peripheral portion accommodates a dimensional change in the central portion by absorbing energy and being transformed from a lower energy state to a higher energy state.

In yet another embodiment, the molten polymer comprises a polyolefin.

In yet another embodiment, the polyolefin comprises a cyclic olefin copolymer.

In yet another embodiment, a method comprises disposing the lens in a fixture.

In yet another embodiment, the lens disposed in the fixture is disposed in an automobile.

BRIEF DESCRIPTION OF THE FIGURES

FIG. 3(A) is a depiction of a side view of an exemplary schematic of the lens disclosed herein;

FIG. 3(B) is one view of a section taken along XX' from FIG. 3(A);

FIG. 3(C) is an expanded view of the section CC' taken from FIG. 3(B);

FIG. 3(D) depicts the change in the profile of the peripheral portion from FIG. 3(C) from before energy absorption to after energy absorption;

FIG. 4(A) is a depiction of a lens with a peripheral portion that contains a prearranged deformation point;

FIG. 4(B) is a view of the cross-section of the lens of the FIG. 4(A) before energy absorption;

FIG. 4(C) is another view of the cross-section of the lens of the FIG. 4(A) after energy absorption;

DETAILED DESCRIPTION

Disclosed herein are lenses that comprise polymers for use in ADAS systems of automobiles. This disclosure presents a novel approach to minimize radial stresses in polymeric lens caused by mismatched coefficient of thermal expansion's (CTE's) and other environmental stresses. The lenses are designed to accommodate forces caused by the CTE mismatch with supporting fixtures thus preventing damage to the lens and mitigating the effect of providing incorrect signals to the driver of an automobile that contains the ADAS system. The polymeric lens have a central portion through which light is transmitted and a peripheral portion that surrounds the central portion, where the peripheral portion is designed to offset a dimensional change in the central portion through energy absorption. The use of an energy absorbing peripheral portion prevents distortion of the field of vision of the lens and the lens can undergo expansion and contraction without undergoing temporary or permanent deformation. The performance of the lens is thus stabilized, while at the same time minimizing the cost of lens used in ADAS systems.

Polymeric lenses are also much less expensive than lenses that contain glass. However, these polymeric lenses have higher CTE's than their glass counterparts, and the mismatch in the CTE with supporting fixtures (that contains the polymeric lens) often leads to undesirable deformation. Current high performance lenses used in ADAS systems are made from metal barrels and all glass elements to minimize image aberrations. These lenses differ from lenses used to display video to a driver in that the fidelity of the imagery produced by the lens is consumed by an algorithm trained to perform perception and modeling. When the consumer of the video is a human, such small aberrations are inconsequential and lower performance lenses can be used.

Figure 1B:
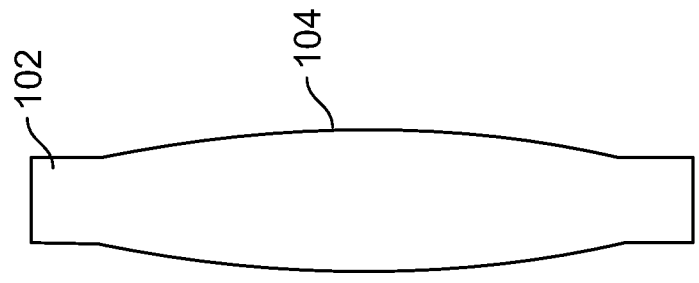
FIG. 1(B) is a depiction of a top view of the prior art lens of FIG. 1(A)
Figure 1A:
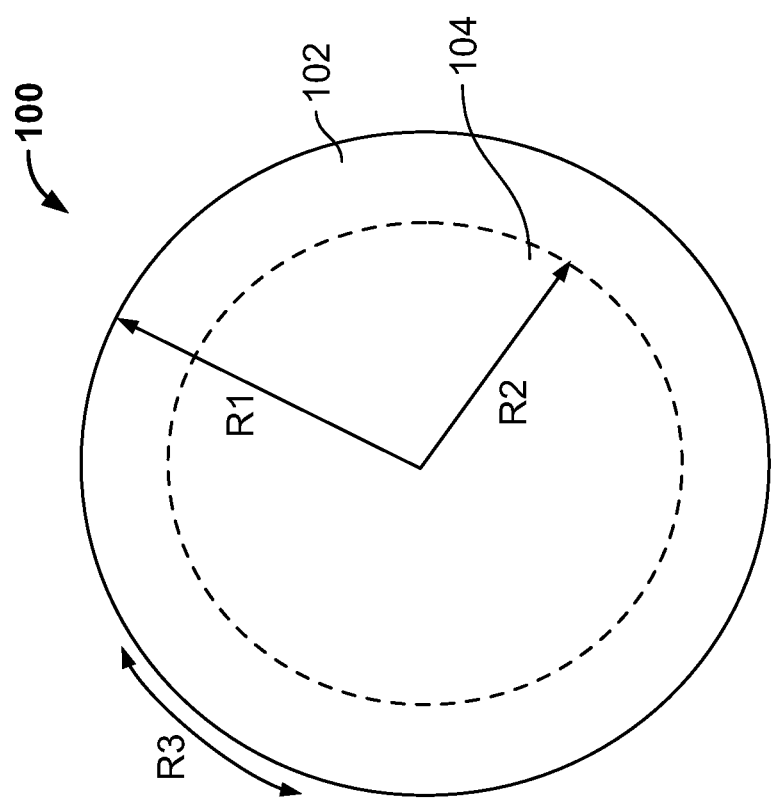
FIG. 1(A) is a depiction of a side view of a prior art lens.

FIGS. 1(A) and 1(B) depicts a conventional lens 100. The lens contains a peripheral portion 102 that surrounds a central portion 104. The light enters the lens through the central portion 104. The light entering the lens is eventually transferred to an image sensor (not shown), or the like. The lens 100 is placed in a supporting fixture (not shown) which provides support and holds it in place during operation of the automobile. In an embodiment, the peripheral portion and the central portion form one solid monolithic piece. Neither the central portion nor the peripheral portion contain any cavities.

The central portion 104 is generally circular having radius $R_2$ while the peripheral portion 102 is also circular having a radius $R_1$ that is larger than $R_2$. When the lens 100 is subjected to a temperature variation, the peripheral portion 102 expands and contracts the most in the circumferential direction (as shown by the arrow $R_3$). The maximum expansion (which will occur when there is a temperature increase) will typically promote an increase in the outer circumference of the lens 100. However, since the lens 100 is constrained in a supporting fixture (not shown) which contacts the lens 100 at its periphery 102, the material located at the periphery of the lens 100 will be subjected to compressive forces.

Similarly, when the lens 100 is subjected to a decrease in temperature, there will be a decrease in the length of the circumference of the lens 100. However, since the lens 100 is constrained in the supporting fixture (not shown) which contacts the lens 100 at its periphery 102, the material located at the periphery of the lens 100 will be subjected to elongational forces.

These continual compressive and elongational forces over time, will promote deformation of the lens. In addition, if either of these forces gets too large it may cause a temporary distortion of the lens' prescription, leading to aberrations. In order to overcome these aberrations, it is desirable to modify the periphery of the lens by having the peripheral portion accommodate the expansion of the central portion of the lens by absorbing energy. The peripheral portion is therefore originally in a position that represents a lower energy state $E_1$. It is to be noted that the lower energy state referred to herein may or may not be the lowest energy state $E_0$. Upon being deformed by the lens, the peripheral portion undergoes a change in shape to a higher energy state $E_2$, such that $E_2$ is greater than $E_1$, which may or may not be greater than $E_0$. When the deforming force on the lens is removed, the peripheral portion returns to its original lower energy state $E_1$.

In one embodiment, the peripheral portion of the lens has spring-like characteristics and undergoes deformation to accommodate the expansion in the central portion brought on by a change in temperature. The central portion may expand or contract depending upon the ambient temperature conditions. In an embodiment, the deformation brings about a change in shape of the peripheral portion without simultaneously undergoing any change in the dimensions (e.g., the total length, total width, total thickness, and the like) of the peripheral portion. When the driving force for the deformation is removed (e.g., the temperature returns back to its original state), the spring-like characteristics of the peripheral portion promotes its return to its original shape.

In another embodiment, the peripheral portion comprises a material that has a coefficient of thermal expansion that is opposed to the coefficient of thermal expansion of the material of the lens. In an embodiment, if the central portion of the lens has a positive coefficient of thermal expansion, then the peripheral portion will have a negative coefficient of thermal expansion. In another embodiment, if the central portion of the lens has a negative coefficient of thermal expansion, then the peripheral portion will have a positive coefficient of thermal expansion. In an embodiment, the peripheral portion generally has a coefficient of thermal expansion that accommodates the difference in thermal expansion between the central portion of the lens and the fixture that accommodates the lens.

Figure 2C:
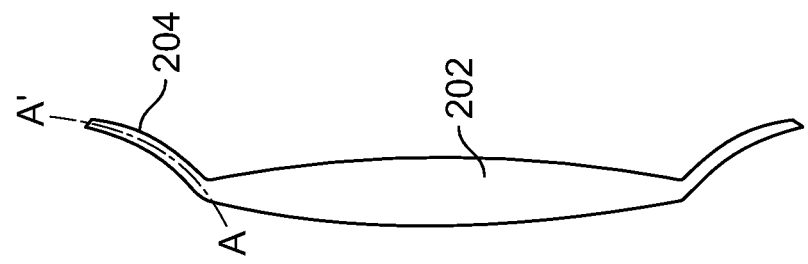
FIG. 2(C) is another view of a section taken along XX' from FIG. 2(A)
Figure 2B:
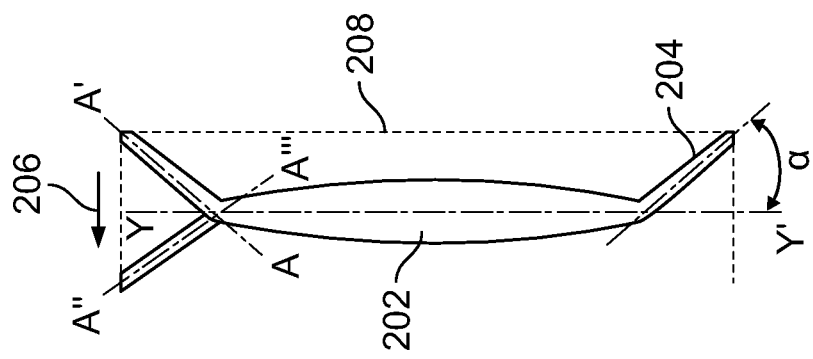
FIG. 2(B) is one view of a section taken along XX' from FIG. 2(A)
Figure 2A:
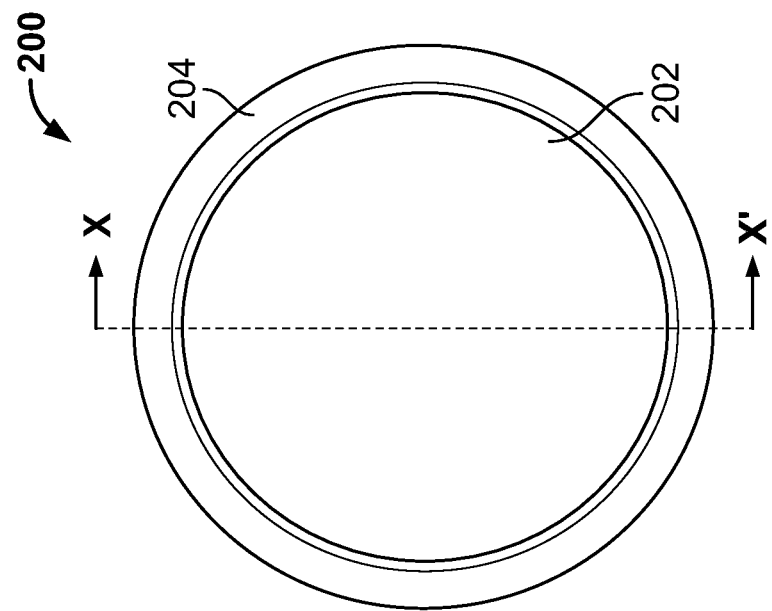
FIG. 2(A) is a depiction of a side view of an exemplary schematic of the lens disclosed herein.

FIGS. 2(A), 2(B) and 2(C) demonstrate one exemplary schematic embodiment of a lens 200 that can accommodate compressive or elongational stresses without any deformation of the lens because the peripheral portion comprises a material that has energy absorbing characteristics. The energy absorbing characteristics are produced by virtue of the nature of the material (e.g., is elastomeric) or because of the shape of the material (e.g., is in the form of a coil or a spring). The lens 200 comprises a peripheral portion 204 that surrounds the central portion 202. The peripheral portion is in partial or continuous contact with the central portion. In one embodiment, the peripheral portion and the central portion form one solid monolithic piece and comprise the same material. In another embodiment, the peripheral portion and the central portion form one solid monolithic piece, even though they may each comprise a different material. In yet another embodiment, the peripheral portion and the central portion may comprise two or more separate components, even though they may each comprise the same material. In another embodiment, the peripheral portion and the central portion may comprise two or more separate components, where each component comprises a different material.

FIG. 2(A) shows a front view of one embodiment of a lens 200 that contains an energy absorbing peripheral portion 204 that completely surrounds a central portion 202 (which functions as a lens for transmitting electromagnetic radiation such as, for example, visible or infrared light). FIG. 2(B) depicts a cross-sectional view of the lens of FIG. 2(A) taken at section XX'. From the FIGS. 2(A) and 2(B), it may be seen that the peripheral portion is inclined at a preferred angle α to a vertical drawn through the lens (when the central portion is positioned vertically). The lens is mounted in a fixture 208 which accommodates the lens such the peripheral portion 204 can be inclined at the preferred angle α at a desired predetermined temperature $T_1$. In an embodiment, $T_1$ is preferably room temperature. When the temperature increases to $T_2$, the lens 202 undergoes expansion forcing an axis AA' of the peripheral portion to travel (within the fixture) to a new position A"A'" in the direction represented by arrow 206. The distance of travel in the fixture is dependent upon the temperature difference $T_2-T_1$. When the temperature returns to $T_1$, the axis of the peripheral portion returns to from A"A'" to its original position AA'. The peripheral portion is therefore in its lowest energy state when its axis is in position AA'. When the temperature of the central portion is changed, the axis of the peripheral portion moves to A"A'", which is a higher energy state. Upon returning the lens to its original temperature, the peripheral portion returns to its lowest energy state represented by original position AA'. It is to be noted that the fixture 208 may have one or more predetermined pathways (not shown here), such as, for example, grooves, splines, and the like, that the peripheral portion may travel along as it deforms from its lowest energy state to a higher energy state and vice versa.

FIG. 2(C) represents another embodiment of the peripheral portion deforming from its lowest energy state to a higher energy state. In the lowest energy state (which may be seen in the FIG. 2(B), the peripheral portion occupies the position represented by axis AA' (which is linear). Upon being subjected to a change in temperature, the peripheral portion undergoes to a higher energy state such that its axis AA' is now curved. FIG. 2(C) does not show the fixture 208, but the fixture constrains the peripheral portion thus causing it to deform to a higher energy state represented by the curved axis AA'.

In an embodiment, the peripheral portion may optionally contain cavities (not shown) that are used for accommodating fasteners such as screws, bolts, nuts, rivets, and the like, that are generally used for affixing the lens to supporting fixtures.

FIGS. 3(A), 3(B), 3(C) and 3(D) all depict another embodiment of the lens 200, where the peripheral portion 204 is deformed from a lower energy state to a higher energy state as the central portion 202 changes its dimensions due to a change in temperature. FIG. 3(A) depicts an exemplary embodiment of a front view of the lens 200 having a peripheral portion 204. FIG. 3(B) shows a cross-sectional view of the lens (constrained in a fixture 208) of the FIG. 3(A) taken along section XX'. FIG. 3(C) is an expanded view of the peripheral portion 204 shown in section CC' from FIG. 3(B). FIGS. 3(B) and 3(C) depict the profile length of the end-to-end distance of the peripheral section (as represented by the curve C1). The end-to-end distance is measured from the outer edge of the lens to the outermost edge of the peripheral portion along the profile of the peripheral portion. As may be seen, the profile is curvilinear. C1 therefore represents the length of the curvilinear path measured along the profile of the peripheral portion. In an embodiment, the curvilinear profile may be sinusoidal with a regular periodicity and amplitude. In another embodiment, the curvilinear profile may be sinusoidal with a regular periodicity and of varying amplitude. When the temperature of the central portion of the lens is changed, the lens expands causing this periodicity and amplitude of the peripheral portion to change. FIG. 3(D) depicts the change in the profile as the peripheral portion changes in shape. As may be seen, the length L1 of the profile measured in the radial direction decreases to a value L2 as the temperature is changed.

While L1 is greater than L2, the actual dimensions (the length of the curvilinear path C1 or the cross-sectional area) of the peripheral section are not changed. The length of the peripheral section C1 remains substantially the same despite the fact that the periodicity and amplitude of the curvilinear profile is changed. In other words, the length C1 of the curvilinear profile remains the same when the peripheral portion is transformed from its lower energy state (with length L1 in the radial direction) to its higher energy state (with length L2 in the radial direction). When the temperature returns to its original value, the curvilinear portion returns to its original lower energy state (with length L1 in the radial direction).

While the FIGS. 2(A)-2(C) and 3(A)-3(D) all depict the peripheral portion 204 as being continuous around the central portion 202, the peripheral portion can also comprise a plurality of elements that are in contact with the central portion but are not in contact with each other. This may be seen in the FIG. 4(A), where the peripheral portion 204 comprises a plurality of elements 204A, 204B, 204C, and so on, that contact the central portion 202 but do not contact each other. Each of the elements 204A, 204B, 204C, and so on, have spring-like characteristics that permit them to deform from a lower energy state to a higher energy state (and vice versa) when the central portion changes its dimensions. The central portion may expand or contract depending upon the ambient temperature. FIGS. 4(B) and 4(C) depict one embodiment where the elements 204A, 204B, 204C, and so on, each have a prearranged deformation point 210 that accommodates dimensional change in the central portion 202. The prearranged deformation point 210 is a point that uses a lower activation energy than the surrounding material (that forms the elements 204A, 204B, and so on) in order to undergo deformation. In an embodiment, each of the elements 204A, 204B, 204C, and so on, may have a plurality of prearranged deformation points (not shown) that can accommodate dimensional changes in the central portion 202. In an embodiment, the plurality of prearranged deformation points can act synchronously and cooperatively to accommodate dimensional changes in the central portion 202. In another embodiment, the plurality of prearranged deformation points do not act synchronously and/or cooperatively to accommodate dimensional changes in the central portion 202. Synchronously means that the plurality of elements undergo deformation at the same time. Cooperatively means that the plurality of elements all undergo deformation of the same amount in the same direction (i.e., they all contract or they all expand by the same amount at the same time).

FIGS. 4(B), and 4(C) are cross-sectional views taken at section XX' of the FIG. 4(A) and depict yet another embodiment of a lens 200, where the peripheral portion 204 has a prearranged deformation point 210 that accommodates dimensional change in the central portion 202. FIG. 4(B) shows the deformation point before the deformation, while FIG. 4(C) shows the deformation point after the deformation. The prearranged deformation point 210 may be a slot, a notch or a cavity that makes it the weakest point on the peripheral portion. When the temperature changes causing a change in the dimensions of the lenses, the peripheral portion undergoes deformation at the prearranged deformation point 210.

While the FIGS. 4(A), 4(B) and 4(C) each show a plurality of elements 204A, 204B, 204C, and so on that do not contact each other, it is recognized that the peripheral portion in these figures may comprise one continuous portion that contacts the central portion 202 continuously around its periphery. In this case, there will be one continuous prearranged deformation point 210 that extends throughout the peripheral portion. In the FIGS. 4(A), 4(B) and 4(C) it may be seen that each of the elements 204A, 204B, 204C, and so on, have a locating element at either end that can contact a supporting fixture at one end and the lens at the other end. One locating element can secure the lens (i.e., the central portion) while the locating element at the opposite end can be used to secure the entire lens in position.

Figure 5C:
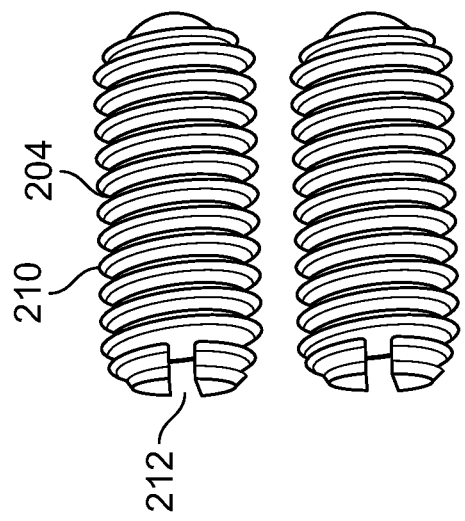
FIG. 5(C) is another exemplary depiction of one embodiment of an element that absorbs energy in the peripheral portion.
Figure 5B:
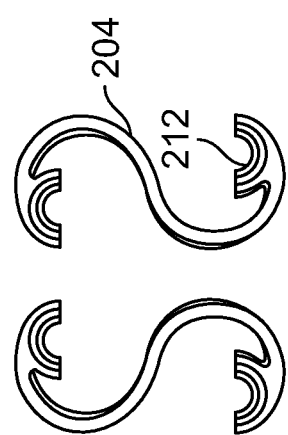
FIG. 5(B) is another exemplary depiction of one embodiment of an element that absorbs energy in the peripheral portion.
Figure 5A:
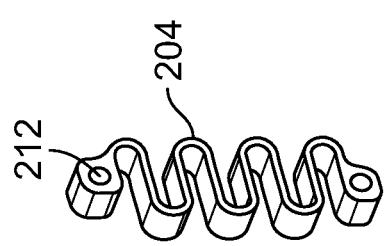
FIG. 5(A) is an exemplary depiction of one embodiment of an element that absorbs energy in the peripheral portion.

FIGS. 5(A), 5(B) and 5(C) depict a variety of different shapes (element) that may be deployed in the peripheral region either as one continuous element or as a plurality of elements. FIGS. 5(A) and 5(B) depict a spring-shaped element 204 that has a sinusoidal profile. This element can absorb the dimensional change (of the central portion) in the form of energy and can return this energy to the lens when the deforming force is removed. The FIG. 5(A) depicts an element 204 having a sinusoidal profile with a plurality of troughs and crests (each of constant amplitude) having a uniform periodicity. Each element 204 has a locating element 212 at each end that facilitates contact with the lens (on one end) and the supporting fixture (at the other end). The FIG. 5(B) depicts an element 204 having a sinusoidal profile that comprises only one trough and crest, each of identical amplitude and periodicity. The element 204 of the FIG. 5(B) also has a locating element 212 at each end.

FIG. 5(C) depicts a pair of elements 204 that have a plurality of prearranged deformation points 210 with a locating element 212 at each end. It is to be noted that the various shapes shown for the elements 204 are only exemplary and a variety of differently shaped elements can be used in lieu of those shapes demonstrated herein.

Figure 6:
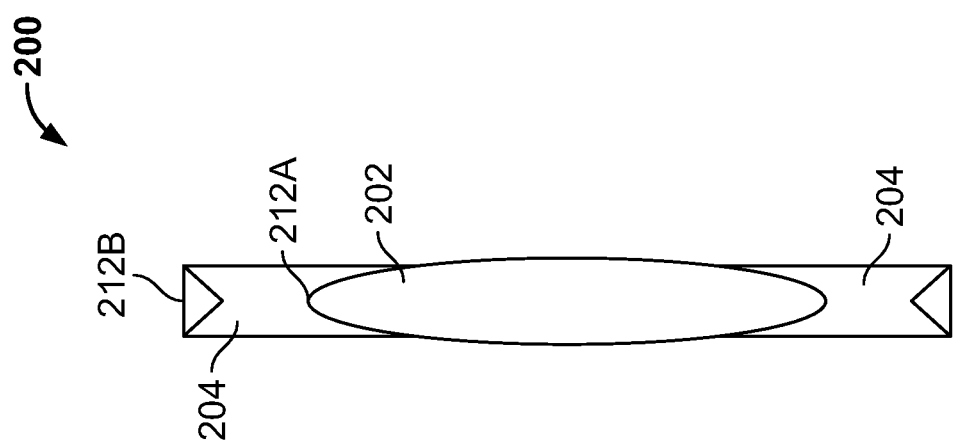
FIG. 6 is a depiction of a lens that comprises a peripheral portion that has a coefficient of thermal expansion with a different sign from the coefficient of thermal expansion of the lens.

FIG. 6 depicts another exemplary embodiment of the lens 200 where the central portion 202 and the peripheral portion 204 have coefficients of thermal expansion with opposite signs. For example, if the central portion has a positive coefficient of thermal expansion, then the peripheral portion has a negative coefficient of thermal expansion. Conversely, if the central portion has a negative coefficient of thermal expansion, then the peripheral portion has a positive coefficient of thermal expansion. In an embodiment, the material used in the peripheral portion has a coefficient of thermal expansion that accommodates the difference in the expansion between the central portion and the supporting fixture.

In the embodiment depicted in the FIG. 6, the peripheral portion 204 may comprise a single continuous element that contacts the lens at all points on its circumferential periphery via a locating element 212A. The other end of the peripheral portion that is opposed to the end that contact the lens contacts a supporting fixture (not shown) via locating element 212B. In another embodiment, the peripheral portion 204 may comprise a plurality of elements (not shown) each of which contact the lens at one end via a locating element 212A while the other end contacts the supporting fixture via another locating element 212B.

The use of a peripheral portion that absorbs the dimensional changes in the central portion by being transformed to a higher energy state or by having a coefficient of thermal expansion with a sign that is opposed to that of the central portion prevents distortion of the central portion and minimizes aberrations of the object being imaged. It also prevents necessary replacement of the lens that would otherwise occur because of permanent deformation (sometimes referred to as permanent set). In another embodiment, when the central portion and the peripheral portion have respective coefficients of thermal expansion that have different signs (positive versus negative), the entropy of the central portion and the entropy of the peripheral portion both decrease simultaneously with a temperature increases and vice versa.

The material used in the lenses is a polymer that is optically transparent. In an embodiment, the polymer is preferably one that is water resistant, ultraviolet radiation resistant and abrasion resistant. Water resistant and/or abrasion resistant coatings may be disposed on the lenses if desired. UV resistant coatings, thermal stabilizers, UV absorbers, infrared resistant coatings, and the like, may also be used in or on the lenses. It is desirable for the polymeric material to have a transmissivity of greater than 85%, preferably greater than 90% and more preferably greater than 95% when measured as per ASTM D1003. The refractive index of the polymer used in the lenses can be 1.1 to 1.7, preferably 1.2 to 1.65 and more preferably 1.45 to 1.58. Higher refractive index coatings such as those containing titania or zirconia may be disposed on the lens if desired.

In an embodiment, a single polymer may be used in the entire lens. In another embodiment, a first polymer may be used in the central portion of the lens, while a second polymer may be used in the peripheral portion. In one embodiment, the first polymer may be the same as the second polymer. In another embodiment, the first polymer may be different from the second polymer.

The first polymer used in the central portion will have a different elastic modulus from the second polymer that is used in the peripheral region. In an embodiment, the first polymer may have a higher elastic modulus than that of the second polymer. In another embodiment, the first polymer may have a lower elastic modulus than that of the second polymer. Even when the central portion comprises the same polymer as the peripheral portion, the peripheral portion will have a different elastic modulus than the central portion. This is generally accomplished by using fillers and/or impact modifiers.

The polymer used in the lens may be selected from a wide variety of thermoplastic polymers, blend of thermoplastic polymers, thermosetting polymers, or blends of thermoplastic polymers with thermosetting polymers. The polymer is preferably an organic polymer. The polymer may comprise a blend of polymers, copolymers, terpolymers, or combinations thereof. The polymer can also be an oligomer, a homopolymer, a copolymer, a block copolymer, an alternating block copolymer, a random copolymer, a graft copolymer, a star block copolymer, a dendrimer, a polyelectrolyte (polymers that have some repeat groups that contain electrolytes), a polyampholyte (a polyelectrolyte having both cationic and anionic repeat groups), an ionomer, or the like, or a combination thereof. The organic polymers have number average molecular weights greater than 10,000 grams per mole, preferably greater than 20,000 g/mole and more preferably greater than 50,000 g/mole. An upper number average molecular weight for the polymers may be 1,000,000 g/mole.

Examples of the organic polymers that may be used in the lenses are polyolefins, polyacrylics, polyacrylates, polymethacrylates, polycarbonates, polystyrenes, polyesters, polyimides, polyetherimides, or the like, or a combination thereof. Polyolefin lenses are preferred.

The polyolefins are preferably those that have low ultraviolet (UV) absorption when exposed to ambient light. Suitable examples of polyolefins are cyclic olefin polymers. In an embodiment, the cyclic olefin polymer comprises a cyclic olefin copolymer. Cyclic olefin copolymers are manufactured by chain copolymerization of cyclic monomers such as 8,9,10-trinorborn-2-ene (norbornene) or 1,2,3,4,4a,5,8,8a-octahydro-1,4:5,8-dimethanonaphthalene (tetracyclododecene) with ethene (such as TOPAS Advanced Polymer's TOPAS®, Mitsui Chemical's APEC), or by ring-opening metathesis polymerization of various cyclic monomers followed by hydrogenation (Japan Synthetic Rubber's ARTON Zeon Chemical's ZEONEX® and ZEONOR®).

When the peripheral portion absorbs the dimensional change of the central portion by absorbing energy due to its spring-like characteristics, the material used does not need to be optically transparent. It is desirable for the material used in the peripheral portion to be deformed to a point below the yield point of the material during the energy absorption process. The polymer used in the peripheral portion may not be optically transparent and can contain fillers and impact modifiers to provide it with the desired mechanical characteristics for energy absorption and energy release.

Suitable polymers for use in the peripheral portion include polyacetals, polyacrylics, polycarbonates, polyalkyds, polystyrenes, polyolefins, polyesters, polyamides, polyaramides, polyamideimides, polyarylates, polyurethanes, epoxies, phenolics, silicones, polyarylsulfones, polyethersulfones, polyphenylene sulfides, polysulfones, polyimides, polyetherimides, polytetrafluoroethylenes, polyetherketones, polyether ether ketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polypropylenes, polyethylenes, polyethylene terephthalates, polyvinylidene fluorides, polysiloxanes, or the like, or a combination thereof.

When the peripheral portion contains polymers that have a CTE with a sign opposite to that of the material used in the lens, it is desirable for the polymer used in the peripheral portion to be an elastomer. Examples of elastomers include polybutadienes, polyisoprenes, styrene-butadiene rubber, poly(styrene)-block-poly(butadiene), poly(acrylonitrile)-block-poly(styrene)-block-poly(butadiene) (ABS), polychloroprenes, epichlorohydrin rubber, polyacrylic rubber, silicone elastomers (polysiloxanes), fluorosilicone elastomers, fluoroelastomers, perfluoroelastomers, polyether block amides (PEBA), chlorosulfonated polyethylene, ethylene propylene diene rubber (EPR), ethylene-vinyl acetate elastomers, or the like, or a combination thereof. In an embodiment, elastomeric polymers or polymers in their elastomeric forms (above the glass transition temperature) generally have negative coefficients of thermal expansion and can therefore be used with a central portion that has a positive coefficient of thermal expansion.

In one embodiment, in one method of manufacturing the disclosed lens, a suitable polymer (such as, for example, one or more of the cyclic olefin copolymers listed above) is fed to an injection molding machine, where it is molded in a mold that has a negative image of the lens shown in the figures. The polymer is injected to the mold at a suitable flow temperature that prevents the formation of pin holes and other defects. The walls of the mold are cooled with a coolant causing the melt to solidify at which point it is ejected from the mold. Vast numbers of lenses can be produced in this manner.

In an embodiment, the lens may also be manufactured by methods such as compression molding, vacuum forming, blow molding, and so on. In another embodiment, additive manufacturing may be used to produce the lens disclosed herein. In yet another embodiment, a combination of one or more of injection molding, vacuum forming, blow molding, compression molding may be used in conjunction with additive manufacturing.

In an embodiment, the molding operation to manufacture the mold is prepared in a two-step process. In another embodiment, when the lens comprises a peripheral portion that is foamed, the foamed peripheral portion may be first injection molded in a first molding step. Suitable blowing agents such as liquid carbon dioxide, liquid nitrogen and the like may be used to produce the foam. The molded, foamed peripheral portion is then placed in a second mold whereupon the central portion is injected to the mold and is fused with the peripheral portion during the second molding operation. The polymer used in the central portion (the first polymer) may or may not be the same as the polymer (the second polymer) used in the peripheral portion. The mold is then cooled and the molded lens with a foamed peripheral portion and an optically clear central portion is then ejected.

The lens can be treated to remove any mold lines and then placed in the structural fixture for use in automobiles, medical devices such as catheters that are inserted into the body and downhole drilling tools in order to measure the excavation progress. In an embodiment, the lens may be located in the proper position by using locating elements present on one or more ends of the peripheral portion.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A lens comprising: a central portion that comprises a first polymer; wherein the central portion is operative to transmit electromagnetic radiation through it; and a peripheral portion that comprises a second polymer; where the peripheral portion accommodates a dimensional change due to a temperature change in the central portion by absorbing energy and being transformed from a lower energy state to a higher energy state; and where the peripheral portion prevents distortion of the field of vision of the lens, where the peripheral portion comprises a prearranged deformation point that renders it the weakest point in the peripheral portion; and wherein the prearranged deformation point is a slot, a notch or a cavity.

2. The lens of claim 1, where the peripheral portion undergoes a change in shape without any substantial dimensional change.

3. The lens of claim 1, where the first polymer is the same as the second polymer.

4. The lens of claim 1, where the first polymer is different from the second polymer.

5. The lens of claim 1, where the peripheral portion surrounds the central portion along its entire circumferential periphery.

6. The lens of claim 5, where the peripheral portion comprises a plurality of elements that do not contact each other.

7. The lens of claim 1, where the peripheral portion has a cross-sectional area that has a linear profile or a curvilinear profile prior to energy absorption.

8. The lens of claim 1, where the linear profile changes to a curvilinear profile due to the energy absorption.

9. The lens of claim 7, where the curvilinear profile is a sinusoidal profile that may contain one or more troughs and one or more crests.

10. The lens of claim 9, where the sinusoidal profile may contain a plurality of troughs and crests of varying amplitude and periodicity and where the amplitude or the periodicity change upon energy absorption.

11. The lens of claim 1, where the peripheral portion comprises a prearranged deformation point.

12. The lens of claim 1, where the second polymer has a negative coefficient of thermal expansion while the first polymer has a positive coefficient of thermal expansion.

13. The lens of claim 1, where the first polymer and the second polymer comprise a cyclic olefin polymer.

14. The lens of claim 12, where the cyclic olefin polymer comprises a cyclic olefin copolymer.

15. An article that comprises the lens of claim 1.

16. The article of claim 15, where the article is an advanced driver assistance system.

17. A method of manufacturing a lens comprising: injecting into a mold a molten polymer to produce the lens; where the lens comprises: a central portion; and a peripheral portion; where the peripheral portion accommodates a dimensional change due to a temperature change in the central portion by absorbing energy and being transformed from a lower energy state to a higher energy state; and where the peripheral portion prevents distortion of the field of vision of the lens, where the peripheral portion comprises a prearranged deformation point that renders it the weakest point in the peripheral portion; and wherein the prearranged deformation point is a slot, a notch or a cavity.

18. The method of claim 17, wherein the molten polymer comprises a polyolefin.

19. The method of claim 17, wherein the polyolefin comprises a cyclic olefin copolymer.

20. The method of claim 17, further comprising disposing the lens in a fixture.

21. The method of claim 20, wherein the fixture with the lens disposed therein is disposed in an advanced driver assistance system.

* * * * *